(12) United States Patent
Jung et al.

(10) Patent No.: US 11,314,453 B2
(45) Date of Patent: Apr. 26, 2022

(54) MEMORY SYSTEM MANAGING MAP DATA BASED ON RISK OF MALWARE—INFECTION OF HOST, AND OPERATING METHOD THEREOF

(71) Applicant: SK hynix Inc., Gyeonggi-do (KR)

(72) Inventors: Jong-Pil Jung, Gyeonggi-do (KR); Duck-Hoi Koo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/871,764

(22) Filed: May 11, 2020

(65) Prior Publication Data
US 2021/0157524 A1 May 27, 2021

(30) Foreign Application Priority Data
Nov. 27, 2019 (KR) .................. 10-2019-0154170

(51) Int. Cl.
*G06F 3/06* (2006.01)
*G06F 12/10* (2016.01)
*G06F 21/56* (2013.01)

(52) U.S. Cl.
CPC .......... *G06F 3/0659* (2013.01); *G06F 3/0604* (2013.01); *G06F 3/0647* (2013.01); *G06F 3/0673* (2013.01); *G06F 12/10* (2013.01); *G06F 21/56* (2013.01); *G06F 2212/657* (2013.01); *G06F 2221/034* (2013.01)

(58) Field of Classification Search
None
See application file for complete search history.

(56) References Cited

FOREIGN PATENT DOCUMENTS

| KR | 10-2019-0002241 | 1/2019 |
| KR | 10-2020-0031402 | 3/2020 |

OTHER PUBLICATIONS

Baek et al., SSD-Insider: Internal Defense of Solid-State Drive against Ransomware with Perfect Data Recovery, 2018 IEEE 38th International Conference on Distributed Computing Systems, pp. 875-884 (Year: 2018).*

* cited by examiner

*Primary Examiner* — Gary W. Cygiel
(74) *Attorney, Agent, or Firm* — IP & T Group LLP

(57) ABSTRACT

A memory system includes: a memory device including: a first memory block storing first map data, which maps a first logical address to a first physical address; and a second memory block storing first user data corresponding to the first map data; and a controller configured to: receive a warning signal from a host; and back up the first map data as second map data in response to the first logical address being provided along with a write command received after the warning signal is received; update the first map data to map the first logical address to a second physical address; suspend an erase operation being performed on the first user data is invalidated due to the write command; and restore the first map data based on the second map data and validate the invalidated first user data when it is determined that the host is infected by malware.

14 Claims, 11 Drawing Sheets

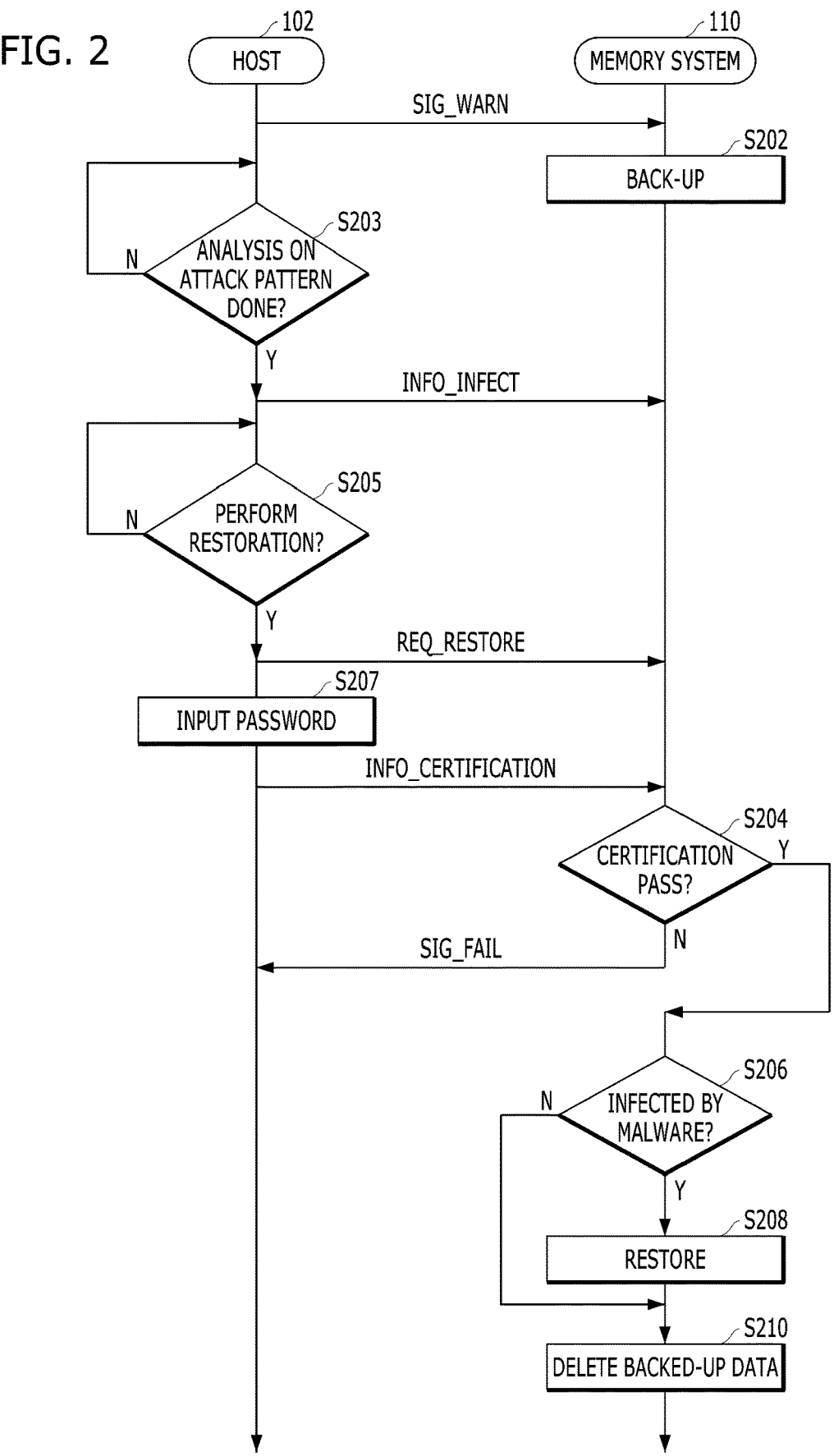

| LA | PA |
|----|-----|
| LA 1 | PA 9 |
| LA 2 | PA 8 |
| LA 3 | PA 3 |
| LA 4 | PA 4 |
| LA 5 | PA 5 |
| LA 6 | PA 6 |

MAP 1

| LA | PA |
|---|---|
| LA 1 | PA 1 |
| LA 2 | PA 2 |
| LA 3 | PA 3 |
| LA 4 | PA 4 |
| LA 5 | PA 5 |
| LA 6 | PA 6 |

MAP 1

| LA | PA |
|---|---|
| LA 1 | PA 9 |
| LA 2 | PA 8 |
| LA 3 | PA 3 |
| LA 4 | PA 4 |
| LA 5 | PA 5 |
| LA 6 | PA 6 |

MAP 1

MEMORY SYSTEM MANAGING MAP DATA BASED ON RISK OF MALWARE—INFECTION OF HOST, AND OPERATING METHOD THEREOF

CROSS-REFERENCE TO RELATED APPLICATION

This application claims priority under 35 U.S.C. § 119 to Korean Patent Application No. 10-2019-0154170, filed on Nov. 27, 2019, which is incorporated herein by reference in its entirety.

BACKGROUND

1. Field

Exemplary embodiments relate to a memory system, and more particularly, to a memory system for restoring user data at the time point at which a warning signal has been received from a host when the host has been infected by malware, and an operating method thereof.

2. Discussion of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

The memory system in accordance with an embodiment may protect a memory system from malware.

In accordance with an embodiment of the present invention, a memory system, including: a memory device including: a first memory block storing first map data, which maps a first logical address to a first physical address; and a second memory block storing first user data corresponding to the first map data; and a controller configured to: receive a warning signal from a host; back up the first map data as second map data in response to the first logical address being provided along with a write command received after the warning signal is received; update, in response to receiving the first logical address and the write command, the first map data to map the first logical address to a second physical address; suspend an erase operation being performed on the first user data that is invalidated due to the write command; and restore the first map data based on the second map data and validate the invalidated first user data when it is determined that the host is infected by malware.

In accordance with another embodiment of the present invention, a method for operating a memory system including a first memory block storing first map data, which maps a first logical address to a first physical address, and a second memory block storing first user data corresponding to the first map data, the operating method includes: receiving a warning signal from a host; backing up the first map data as second map data in response to the first logical address provided along with a write command after the warning signal is received; updating in response to receiving the first logical address and the write command, the first map data to map the first logical address to a second physical address; suspending an erase operation being performed on the first user data that is invalidated due to the write command; and restoring the first map data based on the second map data and validating the invalidated first user data when it is determined that the host is infected by malware.

BRIEF DESCRIPTION OF THE DRAWINGS

FIG. 2 is a flowchart illustrating an operating process of a data processing system in accordance with an embodiment of the present invention.

DETAILED DESCRIPTION

Figure 1:
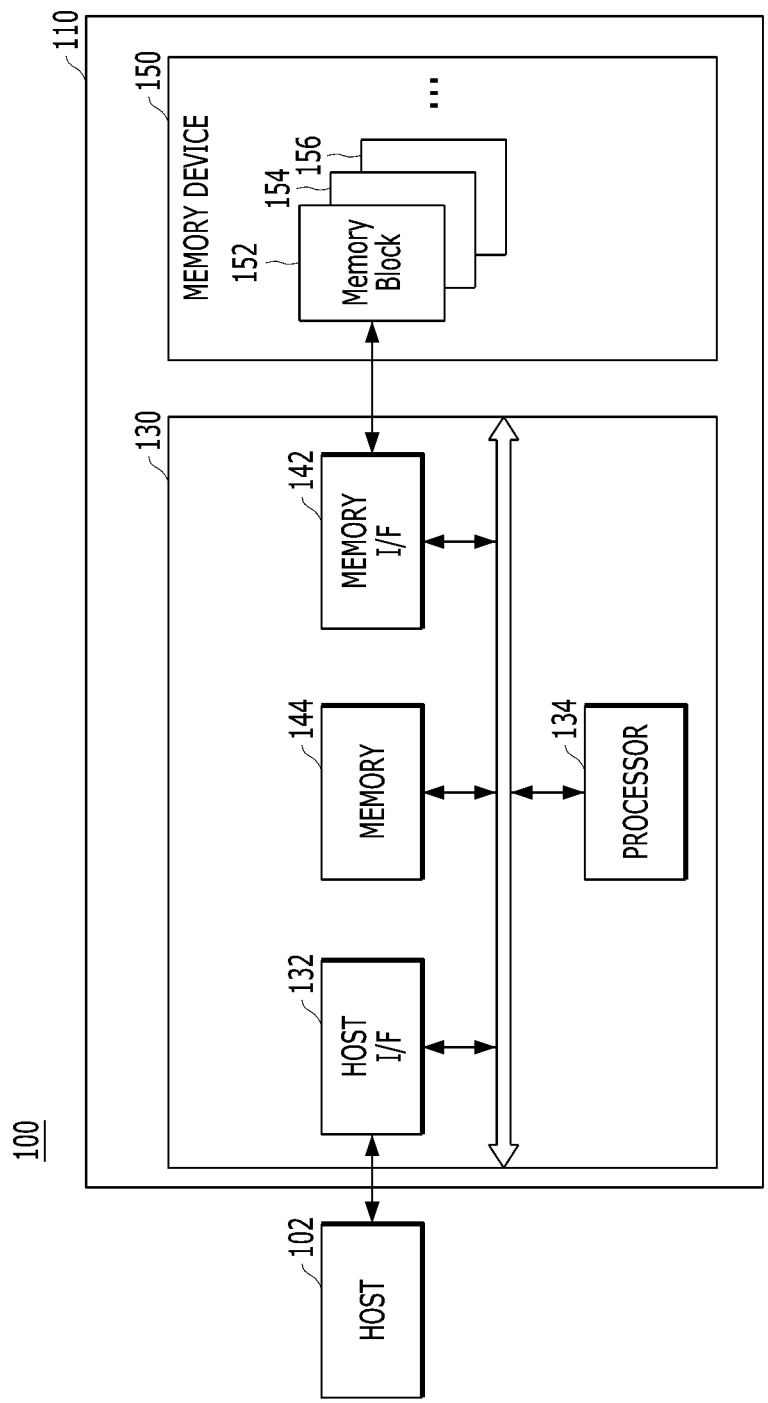
FIG. 1 is a diagram schematically illustrating an example of a data processing system including a memory system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements are not be limited by these terms. These terms are only used to distinguish one element from another element that otherwise have the same or similar names. A first element in one instance could be termed a second element in another instance without indicating any change in the element itself.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The disclosed embodiments are merely for the purpose of understanding the present invention, the scope of which is not limited to the disclosed embodiments. As those skilled in the art to which the present disclosure pertains will recognize in light of the present disclosure various modifications may be made to any of the disclosed embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed in an ideal or excessively formal way.

Various embodiments of the present invention are described in detail below with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player or a laptop computer, or any of a variety of non-portable electronic devices such as a desktop computer, a game machine, a TV or a projector.

The host 102 may include at least one OS (operating system). The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, or an UFS device. The memory system 110 may be configured as a part of a computer, a smart phone, a portable game player, or any of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and/or integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data to perform data write and read operations between the host 102 and the memory device 150 and other data for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134. The background operation performed on the memory device 150 may include an operation of copying data stored in some memory blocks among the memory blocks 152 to 156 of the memory device 150 and storing the copied data into other memory blocks, e.g., a garbage collection (GC) operation, an operation of swapping data of between select memory blocks of the memory blocks 152 to 156, e.g., a wear-leveling (WL) operation, an operation of storing the map data stored in the controller 130 in select memory blocks of the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

FIG. 2 is a flowchart illustrating an operating process of the data processing system 100 in accordance with an embodiment of the present invention.

Malware refers to software designed to penetrate and damage the host 102 in any of various ways. Malware includes ransomware as well as many other kinds of malware. When the host 102 is infected by malware, the host 102 may read data stored in the memory system 110, corrupt the read data, and control the memory system 110 to store the corrupted data in an address where the data has been originally stored. Since original data stored in the memory system 110 is corrupted when the host 102 is infected by malware, a user may acquire the corrupted data rather than the intended original data.

The host 102 may detect malware by using an antivirus program, a vaccine program or other antimalware software. For example, when an attack pattern is detected, the host 102 may detect malware by analyzing the attack pattern utilizing a deep-learning technology. After malware is detected, the host 102 may immediately interrupt communication with the memory system 110. Since it may take a long time to analyze the attack pattern, the time period from when malware has actually penetrated the host 102 (first time point) to when the host 102 interrupts communication with the memory system 110 (second time point) may be relatively long. Between the first and second time points, data stored in the memory system 110 may be corrupted by the malware therein.

In accordance with an embodiment, when the attack pattern is detected, the host 102 may provide a warning signal SIG_WARN, which may be in the form of an alarm, to the memory system 110 based on the analysis of the attack pattern. For example, when the probability that the host 102 has been infected by malware is greater than a threshold probability, the host 102 may provide the warning signal SIG_WARN to the memory system 110. The probability may be calculated by the host 102 based on the analysis result of the attack pattern.

In response to the warning signal SIG_WARN, the memory system 110 may back up original map data whenever map data is changed according to a write command WRITE CMD provided from the host 102 after the warning signal SIG_WARN is received. Then, the memory system 110 may receive a restore request signal REQ_RESTORE and information INFO_INFECT from the host 102. INFO_INFECT may represent whether the host 102 has been infected. When it is determined that the host 102 has been infected by malware based on the information INFO_INFECT, the memory system 110 may restore the map data based on the backed-up original map data.

In accordance with an embodiment, when the attack pattern is detected, the host 102 may provide the warning signal SIG_WARN to the memory system 110 in advance before detecting malware, and the memory system 110 may back up map data in response to the warning signal SIG_WARN. Since the original map data is backed-up, the memory system 110 may restore, when it is determined that the data stored therein is infected, the map data which has been changed after the warning signal SIG_WARN issued. When the host 102 has not been infected by malware, the memory system 110 may delete the backed-up map data, and delete data invalidated by the write command WRITE CMD received after the warning signal SIG_WARN is received, thereby providing the latest data to the host 102 without being affected by the backed-up map data.

Referring to FIG. 2, the host 102 may provide the warning signal SIG_WARN to the memory system 110. The host 102 may detect the attack pattern and analyze the attack pattern by using a vaccine program or other suitable antimalware program. When the probability that the host has been infected by malware is greater than a threshold probability, the host 102 may provide the warning signal SIG_WARN to the memory system 110. For example, when the attack pattern is detected, the host 102 may determine that the probability is greater than the threshold probability.

In step S202, the memory system 110 may back up original map data on a logical address corresponding to a write command provided from the host 102 after the warning signal SIG_WARN is received. The memory system 110 may store the backed-up map data in a system block that stores map data. The memory system 110 may suspend an erase operation being performed on a memory block storing invalidated original user data according to the write command. In accordance with an embodiment, in order to preserve the original user data corresponding to a logical address in the backed-up map data, the memory system 110 may suspend an erase operation on a memory block storing the invalidated original user data. For example, even when all original user data corresponding to the backed-up map data, is invalid, the memory system 110 may not perform the erase operation on the invalidated original user data.

In step S203, the host 102 may determine whether the analysis of the attack pattern is completed. The host 102 may provide infection information INFO_INFECT to the memory system 110 when the analysis of the attack pattern is completed ('Y' in step S203). The infection information INFO_INFECT may indicate whether the host 102 has been infected by malware.

In step S205, the host 102 may prompt a user to indicate whether to perform restoration. When the user instructs the host 102 to perform the restoration ('Y' in step S205), the host 102 may provide the restore request signal REQ_RESTORE to the memory system 110.

In step S207, the host 102 may request the user to perform a certification procedure, and in response thereto, the user may input a password. Based on the password inputted by the user, the host 102 may provide the user certification information INFO_CERTIFICATION to the memory system 110.

In step S204, the memory system 110 may determine whether the certification procedure was successfully completed, based on the received user certification information INFO_CERTIFICATION. For example, the memory system 110 may check whether a first password stored in the memory device 150 matches a second password included in the user certification information INFO_CERTIFICATION. When the first and second passwords match, the certification procedure may be deemed successful, i.e., passed. However, when the first and second passwords do not match, the memory system 110 may determine that the certification procedure failed. When the certification procedure fails ('N' in step S204), the memory system 110 may provide a fail signal SIG_FAIL to the host 102.

In step S206, the memory system 110 may check the infection information INFO_INFECT when the certification procedure passed ('Y' in step S204). For example, the infection information INFO_INFECT may be 1-bit data, and when that bit is logic high, the memory system 110 may determine that the host 102 has been infected by malware. Furthermore, when the INFO_INFECT bit is logic low, the memory system 110 may determine that the host 102 has not been infected by malware.

In step S208, the memory system 110 may perform a restoration procedure when the host 102 has been infected by malware ('Y' in step S206). The memory system 110 may restore the map data by updating the map data based on the backed-up map data or the original map data backed up in step S202. Further, the memory system 110 may validate the invalidated original user data corresponding to the backed-up map data. Since the erase operation on the invalidated original user data has been suspended in step S202, the invalidated original user data may not be removed. After restoring the original map data and validating the invalidated original user data, the memory system 110 may release the suspension of the erase operation on the invalidated original user data and resume the erase operation on such data.

In step S210, the memory system 110 may delete the backed-up map data after the restoration procedure is performed in step S208 or when it is determined that the host 102 has not been infected by malware ('N' in step S206). Furthermore, when the host 102 has not been infected by malware ('N' in step S206), the memory system 110 may remove original user data invalidated after the warning signal SIG_WARN is received by releasing the suspension of the erase operation on the original user data corresponding to the backed-up map data.

Figure 3A:
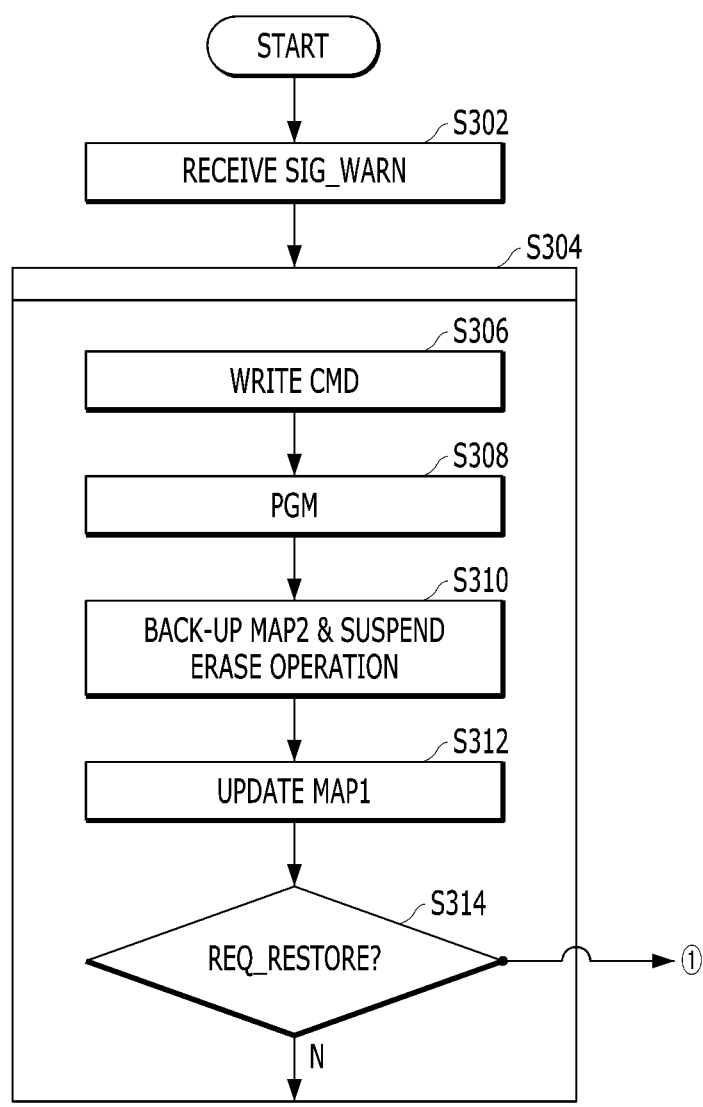
FIG. 3A and FIG. 3B are flowcharts illustrating an operating process of a memory system in accordance with an embodiment of the present invention.
Figure 3B:
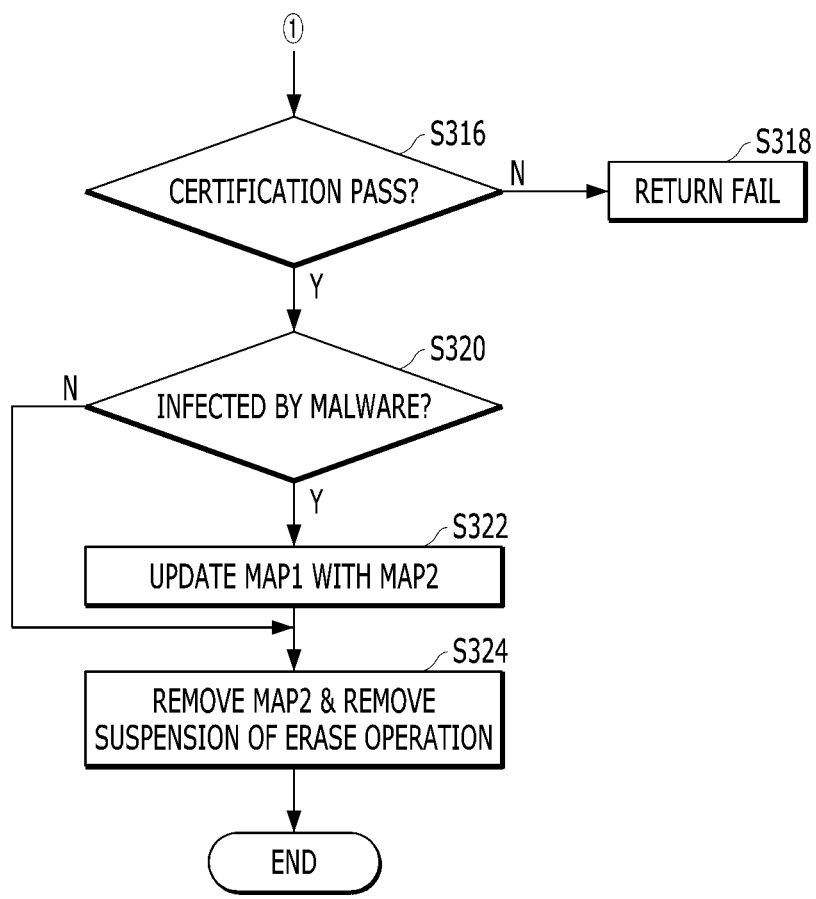

FIG. 3A and FIG. 3B are flowcharts illustrating an operating process of the memory system 110 in accordance with the embodiment.

FIG. 3A is a flowchart for explaining in more detail an operation of backing up map data.

In step S302, the memory system 110 may receive the warning signal SIG_WARN from the host 102 as described above with reference to FIG. 2.

Step S304 may include step S306, step S308, step S310, step S312, and step S314.

In step S304, the memory system 110 may perform program operations and map update operations in response to write commands WRITE CMD provided from the host 102 from the time at which the warning signal SIG_WARN has been received from the host 102 to the time at which the restore request signal REQ_RESTORE is received from the host 102. Simultaneously the memory system 110 may maintain and back up the invalidated original user data and the original map data, respectively, after the warning signal SIG_WARN is received. For example, the memory system 110 may repeatedly perform a program operation, a back-up operation, an original data maintenance operation, and a map update operation until the restore request signal REQ_RESTORE is received. The original data maintenance operation may include backing up the original map data and conserving the invalidated original user data.

Specifically, in step S306, the controller 130 may receive the write command WRITE CMD from the host 102. The host 102 may provide a logical address and program data to the controller 130 together with the write command WRITE CMD, and the controller 130 may determine a physical address where the program data is to be stored and map the logical address and the physical address.

In step S308, the controller 130 may control the memory device 150 to perform a program operation PGM in response to the write command WRITE CMD. When first user data corresponding to a logical address included in the write command WRITE CMD has already been stored in the memory device 150, the controller 130 may control the memory device 150 to invalidate the first user data and program second user data corresponding to the write command WRITE CMD to an open block.

In step S310, the controller 130 may back up original map data, which corresponds to the logical address included in the write command WRITE CMD among first map data MAP1, as second map data MAP2. The backed-up map data may correspond to the invalidated first user data. For example, the controller 130 may control the memory device 150 to program the second map data MAP2 (i.e., the original map data corresponding to the invalidated first user data) to a system block. Furthermore, the controller 130 may suspend an erase operation being performed on the invalidated first user data corresponding to a logical address included in the second map data MAP2.

In accordance with an embodiment, when it is determined later that the host 102 has been infected by malware, the controller 130 may restore, based on the backed-up second map data MAP2, the first map data, which has changed, after the warning signal SIG_WARN issues. Furthermore, the controller 130 may validate the invalidated first user data corresponding to the backed-up second map data MAP2.

When a subsequent write command is provided along with the logical address included in the second map data MAP2 after the second map data MAP2 is backed up, the controller 130 may not perform map data backup and may not suspend erase operation for the subsequent write command. In accordance with an embodiment, in a case where the map data and the user data are changed after the warning signal SIG_WARN is received, when it is determined later that the host 102 has been infected by malware, the controller 130 may restore the backed-up original map data and the invalidated original user data. Accordingly, when data corresponding to the original map data is changed a plurality of times, only the first backed-up map data may be restored and the first invalidated original user data may be validated.

In step S312, the controller 130 may update the first map data based on the map data, which has changed, according to the program operation. For example, within the first map data, the controller 130 may change a physical address, which corresponds to the logical address included in the write command WRITE CMD, to an address of an open block where the program data has been programmed. The first map data may refer to general map data which maps a logical address of data stored in the memory device 150 to a physical address of the same.

In step S314, the controller 130 may determine whether the restore request signal REQ_RESTORE has been received. When the restore request signal REQ_RESTORE has not been received, the controller 130 may perform steps S306, S308, S310, and S312 again.

Hereinafter, with reference to FIG. 4A, FIG. 4B, FIG. 5A, FIG. 5B, FIG. 6, FIG. 7A, FIG. 7B, and FIG. 8, step S304 is described in more detail.

Figures 4A, 4B:
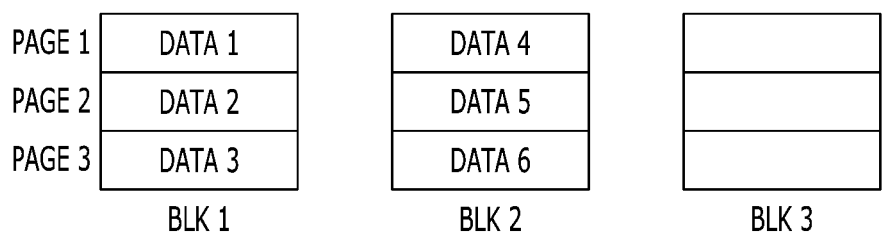
FIG. 4A and FIG. 4B are diagrams illustrating user data stored in memory blocks and map data for the user data at the time at which a warning signal has been received.

FIG. 4A and FIG. 4B are diagrams illustrating user data stored in memory blocks and map data for the user data at the time point at which the warning signal has been received.

For convenience of description, three memory blocks each including three pages is described as an example.

Referring to FIG. 4A, first and second memory blocks BLK1 and BLK2 may store first to third data DATA1 to DATA3 and fourth to sixth data DATA4 to DATA6, respectively, at the time at which the warning signal SIG_WARN has been received. A third memory block BLK3 may be an open block.

FIG. 4B illustrates first map data for the user data.

For convenience of description, a case where the first to sixth data DATA1 to DATA6 correspond to first to sixth logical addresses LA1 to LA6, respectively, is described.

The first map data may be physical-to-logical (L2P) map data. Referring to the first map data MAP1, the first to sixth logical addresses LA1 to LA6 may correspond to first to sixth physical addresses PA1 to PA6, respectively. The first to sixth physical addresses PA1 to PA6 may indicate blocks and pages in which the first to sixth data DATA1 to DATA6 have been stored, respectively. For example, the first physical address PA1 may indicate a first page PAGE1 of the first memory block BLK1 in which the first data DATA1 has been stored, and the fifth physical address PA5 may indicate a second page PAGE2 of the second memory block BLK2 in which the fifth data DATA5 has been stored.

Figures 5A, 5B:
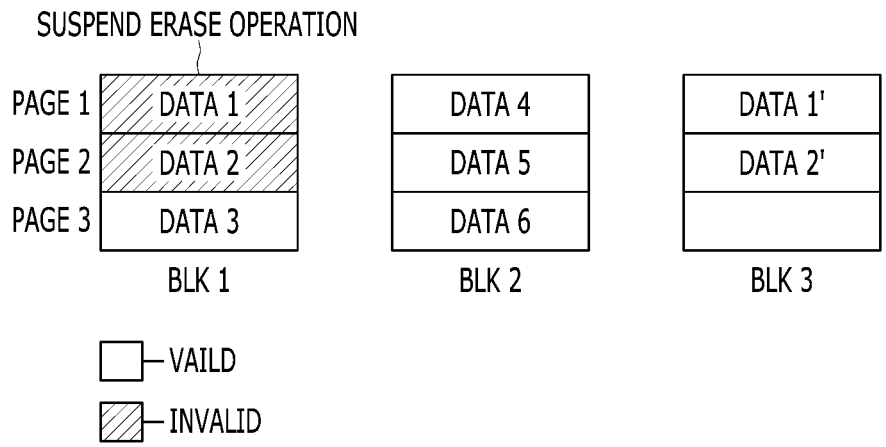
FIG. 5A and FIG. 5B are diagrams illustrating user data stored in memory blocks and updated map data after program operations are performed.

FIG. 5A and FIG. 5B are diagrams illustrating user data stored in memory blocks and updated map data after the program operations are performed.

Referring to FIG. 5A, when write commands each including the first and second logical addresses LA1 and LA2 are provided from the host 102, the controller 130 may control the memory device 150 to invalidate the first and second data DATA1 and DATA2 corresponding to the first and second logical addresses LA1 and LA2 and stored in the first memory block BLK1, and to program first and second data DATA1' and DATA2' corresponding to the write commands to the open block BLK3. In order to maintain the invalidated first and second data in the memory device 150, the controller 130 may suspend an erase operation on the first memory block BLK1 storing the invalidated first and second data.

The controller 130 may update the first map data MAP1 due to the program operation. Referring to FIG. 5B, after performing the program operation, the controller 130 may change the physical addresses corresponding to the first and second logical addresses LA1 and LA2 to seventh and eighth physical addresses PA7 and PA8, respectively. The seventh and eighth physical addresses PA7 and PA8 may indicate the first page PAGE1 of the third block BLK3 and the second page PAGE2 of the third block BLK3, respectively.

Figure 6:
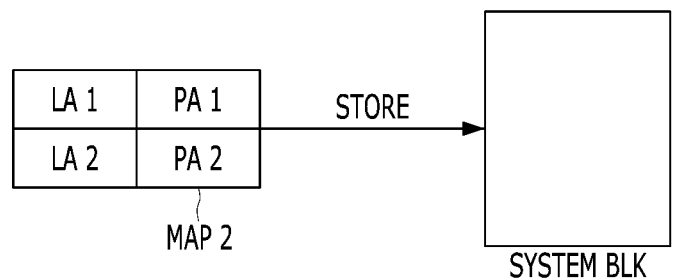
FIG. 6 is a diagram illustrating an operation of storing backed-up map data in a system block.

FIG. 6 is a diagram illustrating an operation of storing backed-up map data in a system block.

After the warning signal SIG_WARN is received, the controller 130 may back up, as second map data MAP2, the original map data for the first and second logical addresses LA1 and LA2 included in the write commands provided from the host 102 among the first map data MAP1. For example, the controller 130 may store, in a system block SYSTEM BLK, second map data MAP2 for the original first and second logical addresses LA1 and LA2 in the first map data MAP1 illustrated in FIG. 4B. The original first and second logical addresses LA1 and LA2 included in the second map data MAP2 may correspond to the first and second physical addresses PA1 and PA2, respectively, differently from the first map data MAP1 updated according to the write commands as illustrated in FIG. 5B.

Figures 7A, 7B:
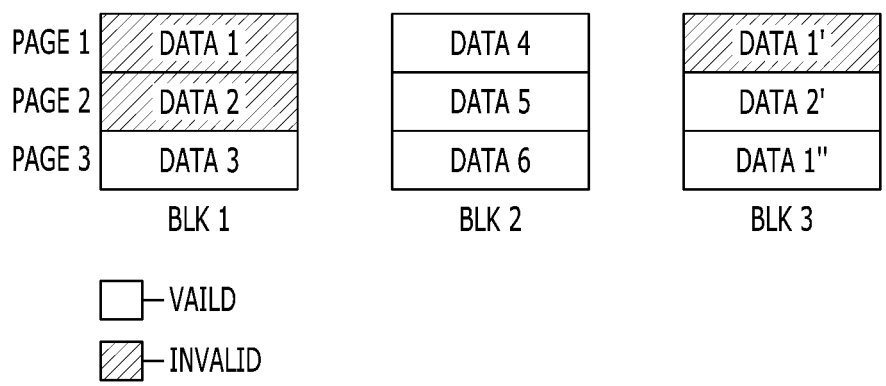
FIG. 7A and FIG. 7B are diagrams illustrating user data stored in memory blocks and updated map data when a plurality of write commands are received for one logical address.

FIG. 7A and FIG. 7B are diagrams illustrating user data stored in memory blocks and updated map data when a plurality of write commands are received along with one logical address.

When a write command including the first logical address LA1 is provided from the host 102 in a state in which the user data has been stored in the memory blocks as illustrated in FIG. 7A, the controller 130 may control the memory device 150 to invalidate the first data DATA1' and program first data DATA1" corresponding to the write command to the third page PAGE3 of the third memory block BLK3.

Referring to FIG. 7B, the controller 130 may update the first map data MAP1 such that the first logical address LA1 corresponds to a ninth physical address PA9. The ninth physical address PA9 may indicate the third page PAGE3 of the third memory block BLK3 in which the first data DATA1" has been programmed.

Figure 8:
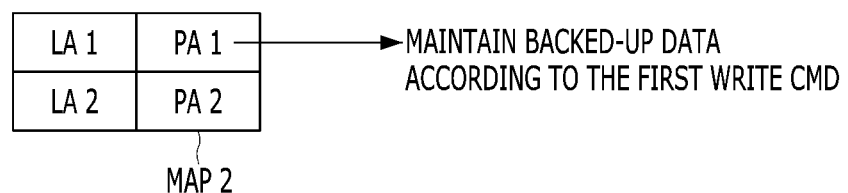
FIG. 8 is a diagram illustrating an operation of maintaining map data backed-up in response to a first write command when a plurality of write commands are received for one logical address.

FIG. 8 is a diagram illustrating an operation of maintaining backed-up map data in response to a first write command when a plurality of write commands are received for one logical address.

When the write command including the first logical address LA1 is received twice after the warning signal SIG_WARN is received, the controller 130 may back up the original map data on the logical address included in the write command as second map data MAP2 in response to the initially received write command, and may perform no map data backup for other write commands. For example, the controller 130 may back up the original map data for the first logical address LA1 among the first map data MAP1 illustrated in FIG. 4B as the second map data MAP2 in response to the first write command including the first logical address LA1, and may not change the original map data for the first logical address LA1 among the backed-up second map data MAP2 when a subsequent write command for the first logical address LA1 is received. Even when a plurality of write commands including the same logical address are received, the controller 130 may not back up map data every time the write commands are received, but back up the original map data related with the first write command, thereby restoring the original data at the time point at which the warning signal SIG_WARN has been received.

Returning back to FIG. 3B, in step S316, the controller 130 may determine whether the user certification is successful when the restore request signal REQ_RESTORE is received from the host 102. As described above with reference to FIG. 2, the controller 130 may determine whether the user certification is successful by comparing whether a first password provided from the host 102 matches a second password stored in the memory device 150.

In step S318, when the user certification fails ('N' in step S316), the controller 130 may return a fail signal to the host 102.

In step S320, the controller 130 may determine whether the host 102 has been infected by malware. As described above with reference to FIG. 2, the controller 130 may determine whether the host 102 has been infected by malware, according to the infection information INFO_INFECT provided from the host 102.

In step S322, when the host 102 has been infected by malware ('Y' in step S320), the controller 130 may restore the first map data by updating the first map data MAP1 based on the second map data MAP2 (i.e., the original map data) backed up in step S304. Furthermore, the controller 130 may validate invalidated original user data corresponding to the backed-up original map data, and invalidate all the remaining user data corresponding to the logical address within the backed-up map data. The remaining user data may be the user data programmed second or later in response to the second and subsequent write commands provided along with the logical address within the backed-up map data.

In step S324, after updating the first map data or when the host 102 has not been infected by malware ('N' in step S320), the controller 130 may remove the second map data MAP2 and release the suspension of the erase operation on the invalidated original user data corresponding to the second map data MAP2.

Figures 9A, 9B:
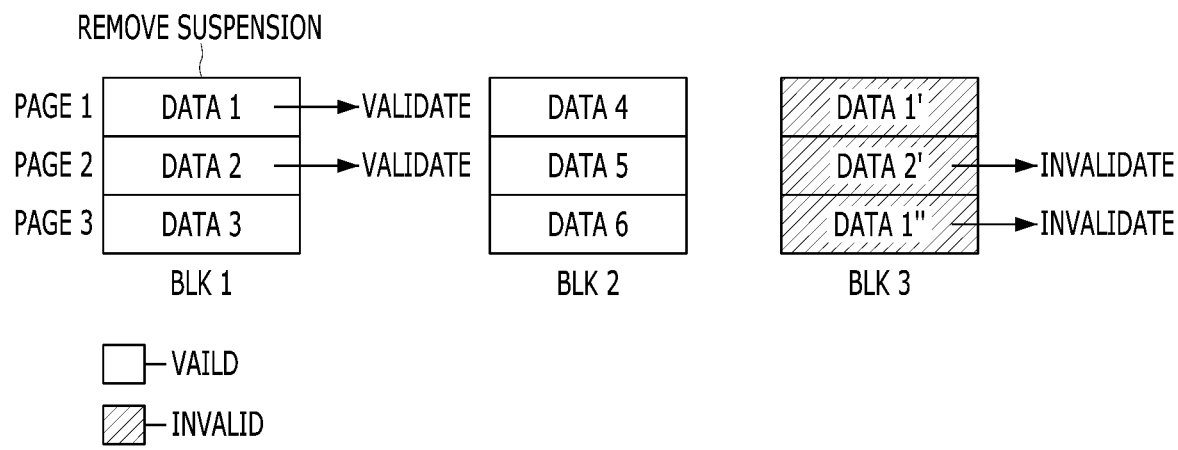
FIG. 9A and FIG. 9B are diagrams for explaining an operation of restoring user data when a host has been infected by malware.

FIG. 9A and FIG. 9B are diagrams for explaining an operation of restoring user data when the host has been infected by malware.

Referring to FIG. 9A, when the host 102 has been infected by malware, the controller 130 may validate the original first and second data DATA1 and DATA2 included in the physical addresses PA1 and PA2 included in the second map data MAP2 illustrated in FIG. 6. Furthermore, the controller 130 may invalidate all the latest data DATA1" and DATA2' among the remaining data except for the first and second data DATA1 and DATA2 among the data DATA1, DATA1', DATA1", DATA2, and DATA2' for the logical addresses LA1 and LA2 included in the second map data MAP2.

Referring to FIG. 9B, the controller 130 may update the first map data MAP1 based on the second map data MAP2, so that the first map data is restored at the time at which the warning signal SIG_WARN has been received. Then, when the host 102 provides a read command for the first and second logical addresses LA1 and LA2, the controller 130 may output the first and second data DATA1 and DATA2 stored in the first and second physical addresses PA1 and PA2, respectively, based on the updated first map data MAP1. Since all the first data DATA1' and DATA1" and the second data DATA2' programmed to the third memory block BLK3 after the warning signal SIG_WARN is received have been invalidated and thus are invalid data, the controller 130 may control the memory device 150 to perform an erase operation on the third memory block BLK3 including the invalid data.

Figures 10A, 10B:
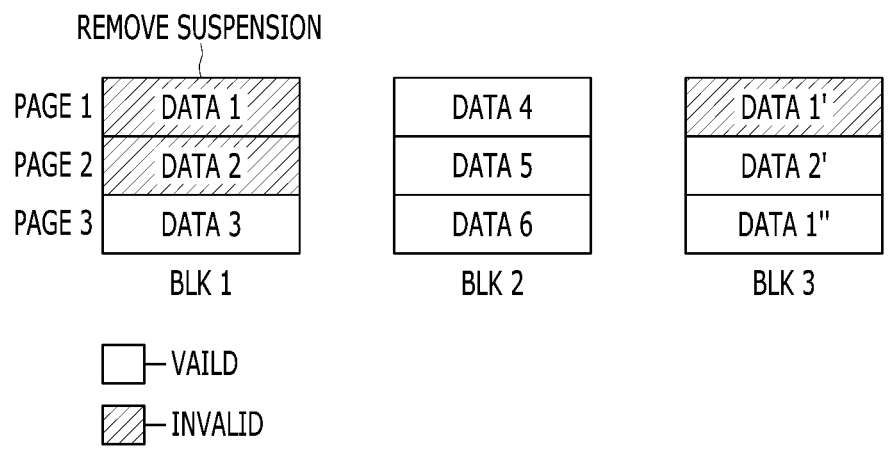
FIG. 10A and FIG. 10B are diagrams for explaining an operation of releasing suspension of an erase operation on a memory block when the host has not been infected by malware.

FIG. 10A and FIG. 10B are diagrams for explaining an operation of releasing the suspension of an erase operation on a memory block when the host has not been infected by malware.

When the host 102 has not been infected by malware, the controller 130 may remove the second map data MAP2 and release the suspension of the erase operation on the invalidated original user data. Thus, the erase operation on the invalidated original user data is resumed.

When the host 102 has not been infected by malware, since the controller 130 does not update the first map data MAP1 based on the second map data MAP2, all logical addresses included in the first map data MAP1 may correspond to physical addresses where the latest data has been stored, respectively. For example, the first logical address LA1 may correspond to the ninth physical address PA9 indicating the third page PAGE3 of the third memory block BLK3 in which the latest data among data corresponding to the first logical address LA1 has been stored.

The memory system 110 in accordance with an embodiment may back up map data at the time at which the warning signal SIG_WARN has been received from the host 102 before it is determined that the host 102 has been infected by malware, thereby restoring user data at the time at which the warning signal SIG_WARN has been received. Accordingly, malicious data generated by malware and programmed to the memory device 150 may not be provided to the host 102 from the time at which the warning signal SIG_WARN has been received to the time at which it is determined that the host 102 has been infected by malware.

According to embodiments of the present invention, the memory system may back up map data before it is determined that the host has been infected by malware by backing up the map data at the time at which the warning signal has been received from the host. The memory system may restore user data at the time at which the warning signal has been received by using the backed-up data. Accordingly, malicious data, generated by malware and programmed to the memory device, from the time at which the warning signal has been received to the time at which it is determined that the host has been infected by malware, may not be provided to the host.

Although various embodiments have been illustrated and described, it will be apparent to those skilled in the art in light of the present disclosure that various changes and modifications may be made without departing from the spirit and scope of the invention as defined in the following claims. The present invention encompasses all such changes and modifications that fall within the scope of the claims.

What is claimed is:
1. A memory system comprising:
a memory device including:

a first memory block, storing first map data, which maps a first logical address to a first physical address; and a second memory block storing first user data corresponding to the first map data; and a controller configured to:

receive a warning signal from a host, the warning signal indicating that the host detects a risk of malware-infection;

back up the first map data as second map data in response to the first logical address being provided along with a write command received after the warning signal is received;

update, in response to receiving the first logical address and the write command, the first map data to map the first logical address to a second physical address;

suspend an erase operation being performed on the first user data that is invalidated due to the write command; and restore the first map data based on the second map data and validate the invalidated first user data in response to a first infection information from the host, the first infection information indicating that the host determines itself to be infected by malware.

2. The memory system of claim 1, wherein the controller controls the memory device to remove the second map data in response to a second infection information from the host, the second infection information indicating that the host determines itself not to be infected by the malware.

3. The memory system of claim 1, wherein the controller releases the suspension of the erase operation on the second memory block in response to a second infection information from the host, the second infection information indicating that the host determines itself not to be infected by the malware.

4. The memory system of claim 1, wherein the controller is further configured to invalidate the first user data when the first map data is updated.

5. The memory system of claim 4, wherein the controller is further configured to release the suspension of the erase operation after validating the first user data.

6. The memory system of claim 1, wherein the controller restores the first map data by updating the first map data to map the first logical address to the first physical address based on the second map data.

7. An operating method of a memory system including a first memory block storing first map data, which maps a first logical address to a first physical address, and a second memory block storing first user data corresponding to the first map data, the operating method comprising:

receiving a warning signal from a host, the warning signal indicating that the host detects a risk of malware-infection;

backing up the first map data as second map data in response to the first logical address provided along with a write command after the warning signal is received;

updating, in response to receiving the first logical address and the write command, the first map data to map the first logical address to a second physical address;

suspending an erase operation being performed on the first user data that is invalidated due to the write command; and restoring the first map data based on the second map data and validating the invalidated first user data in response to a first infection information from the host, the first infection information indicating that the host determines itself to be infected by malware.

8. The operating method of claim 7, further comprising:
controlling the memory device to remove the second map data in response to a second infection information from the host, the second infection information indicating that the host determines itself not to be infected by the malware.

9. The operating method of claim 7, further comprising:
releasing the suspension of the erase operation, in response to a second infection information from the host, the second infection information indicating that the host determines itself not to be infected by the malware.

10. The operating method of claim 7, further comprising:
invalidating the first user data when the first map data is updated.

11. The operating method of claim 10, further comprising:
releasing the suspension of the erase operation after validating the first user data.

12. The operating method of claim 7, wherein the restoring of the first map data and the first user data includes updating the first map data to map the first logical address to the first physical address based on the second map data.

13. An operating method of a controller for controlling a memory device, the operating method comprising:

backing up, in response to an externally provided warning signal, one or more pieces of map data when the pieces are updated due to unauthorized access to the memory device, the warning signal indicating that a host detects a risk of malware-infection;

controlling the memory device to conserve invalidated data corresponding to the backed-up pieces due to the unauthorized access; and replacing, in response to an externally provided infection-detection signal, the updated pieces with the backed-up pieces while validating the invalidated data, the infection-detection signal indicating that the host determines itself to be infected by malware.

14. The operating method of claim 13, further comprising removing, in response to an externally provided non-infection-detection signal, the backed-up pieces and the invalidated data, the non-infection-detection signal indicating that the host determines itself not to be infected by the malware.

* * * * *